(12) United States Patent
Tesauro et al.

(10) Patent No.: US 9,298,172 B2
(45) Date of Patent: *Mar. 29, 2016

(54) METHOD AND APPARATUS FOR IMPROVED REWARD-BASED LEARNING USING ADAPTIVE DISTANCE METRICS

(75) Inventors: Gerald J. Tesauro, Croton-on-Hudson, NY (US); Kilian Q. Weinberger, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

This patent is subject to a terminal disclaimer.

(21) Appl. No.: 11/870,661

(22) Filed: Oct. 11, 2007

(65) Prior Publication Data

US 2009/0099985 A1 Apr. 16, 2009

(51) Int. Cl.
*G06F 15/18* (2006.01)
*G05B 13/02* (2006.01)
*G06K 9/62* (2006.01)
*G06N 5/02* (2006.01)

(52) U.S. Cl.
CPC .......... *G05B 13/0265* (2013.01); *G06K 9/6267* (2013.01); *G06K 9/6276* (2013.01); *G06N 5/02* (2013.01)

(58) Field of Classification Search
CPC ......... G06N 5/02; G06N 5/04; G06K 9/6267; G06K 9/6276
USPC .......................................................... 706/12
See application file for complete search history.

(56) References Cited

U.S. PATENT DOCUMENTS 6,353,814 B1 * 3/2002 Weng ............................. 706/12
7,409,371 B1 * 8/2008 Heckerman et al. ............ 706/12

OTHER PUBLICATIONS

Baird, Leemon. "Residual Algorithms: Reinforcement Learning with Function Approximation" Machine learning Conference Jul. 1995. p. 1-9 [Online] Downloaded Dec. 3, 2010. http://www.cs.utsa.edu/~bylander/cs6243/baird95residual.pdf.*
Belkin, Mkihail and Partha Niyogi. "Laplacian Eigenmaps for Dimensionality Reduction and Data Representation" [Online] Downloaded Oct. 21, 2010. Neural Computation 15, 1373-1396 2003 http://www.princeton.edu/~yxi/paper/dimensionality%20reduction/Laplacian%20Eigenmaps.pdf.*
Bengio, Yoshua, Jean Francois Paiment, and Pascal Vincent "OutofSample Extensions for LLE, Isomap, MDS, Eigenmaps, and Spectral Clustering" [Online] Downloaded Oct. 26, 2010. Jul. 25, 2003 http://www.iipl.fudan.edu.cn/~zhangjp/literatures/MLF/manifold%20learning/tr1238.pdf.*

(Continued)

*Primary Examiner* — Ben Rifkin
(74) *Attorney, Agent, or Firm* — Louis Percello (57) ABSTRACT

The present invention is a method and an apparatus for reward-based learning of policies for managing or controlling a system or plant. In one embodiment, a method for reward-based learning includes receiving a set of one or more exemplars, where at least two of the exemplars comprise a (state, action) pair for a system, and at least one of the exemplars includes an immediate reward responsive to a (state, action) pair. A distance metric and a distance-based function approximator estimating long-range expected value are then initialized, where the distance metric computes a distance between two (state, action) pairs, and the distance metric and function approximator are adjusted such that a Bellman error measure of the function approximator on the set of exemplars is minimized. A management policy is then derived based on the trained distance metric and function approximator.

24 Claims, 6 Drawing Sheets

(56) References Cited

OTHER PUBLICATIONS

Dwinnell, Will. Data Mining in Matlab: Exploring data mining using Matlab (and soemtimes Matlab toolboxes) Posted Friday, Nov. 17, 2006. p. 1-3 http://matlabdatamining.blogspot.com/2006/11/mahalanobis-distance.html.*

Santamaria, Jose . . . , Richard Sutton, and Ashwin Ram. "Experiments with Reinforcement Learning in Problems with continuous state and action spaces" COINS technical report 96-088 Dec. 1996 p. 1-43. [Online] Downloaded Dec. 3, 2010 http://citeseerx.ist.psu.edu/viewdoc/summary?doi=10.1.1.27.4603.*

Teknomo, Kardi. 2005. Q-Learning by Examples. [Online] Downloaded Dec. 3, 2010 http://people.revoledu.com/kardi/tutorial/ReinforcementLearning/index.html.*

Si, Jenni eand Yu-Tsung Wang. "Neuro-Dynamic Programming Based on Self-Organized Patterns" Proceedings of the 1999 IEEE International Sympsoium on Intelligent Control/Intelligent Systems and Seniotics. 1999. [Online] Downloaded Apr. 20, 2011. http://ieeexplore.ieee.org/stamp/stamp.jsp?tp=&arnumber=796641.*

Kohavi, Ron. "A Study of Cross-Validation and Bootstrap for Accuracy Estimation and Model Selection" International Joint Conference on Artificial Intelligence, 1995. [Online] DOwnloaded Sep. 20, 2011. http://www.seas.upenn.edu/~cis520/accEst.pdf.*

Siva Natarajan and R. Russel Rhinehart "Automated Stopping Criteria for Neural Network Training" proceedings of the American Control Conference IEEE 1997 [Online] Downloaded Feb. 14, 2012. http://ieeexplore.ieee.org/stamp/stamp.jsp?arnumber=00609154.*

* cited by examiner

METHOD AND APPARATUS FOR IMPROVED REWARD-BASED LEARNING USING ADAPTIVE DISTANCE METRICS

BACKGROUND

The present invention relates generally to the management or control of systems or plants, and relates more particularly to the automatic development of management policies using reward-based learning.

In many application domains, such as distributed computing systems, the development of management policies typically entails the development of explicit models of system behavior (e.g., based on queuing theory or control theory) and interactions with external components or processes (e.g., users submitting jobs to the system). A common problem with such an approach is that devising the necessary models is often a knowledge- and labor-intensive, as well as time consuming, task. Hence, there is a great need for adaptive machine learning methods (e.g., reward-based learning methods) to automatically develop effective management policies, thereby avoiding extensive and time-consuming engineering of explicit domain knowledge.

However, a frequent and common limitation of such machine learning methods is that learning becomes progressively more difficult as the complexity of the managed system increases. For example, the complexity of learning may commonly increase exponentially with the total number of input dimensions (i.e., the number of input variables plus the number of control variables; this is sometimes referred to as the "Curse of Dimensionality").

Thus, there is a need for an improved method for reward-based learning that addresses the curse of dimensionality which limits existing methods.

SUMMARY OF THE INVENTION

The present invention is a method and an apparatus for reward-based learning of policies for managing or controlling a system or plant. In one embodiment, a method for reward-based learning includes receiving a set of one or more exemplars, where at least two of the exemplars comprise a (state, action) pair for a system, and at least one of the exemplars includes an immediate reward responsive to a (state, action) pair. A distance metric and a distance-based function approximator estimating long-range expected value are then initialized, where the distance metric computes a distance between two (state, action) pairs, and the distance metric and function approximator are adjusted such that a Bellman error measure of the function approximator on the set of exemplars is minimized. A management policy is then derived based on the trained distance metric and function approximator.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for reward-based learning of management or control policies, utilizing innovative methods for distance metric learning. Embodiments of the invention learn a distance metric $D(\ )$ expressing a distance between two (state, action) pairs, while simultaneously learning a distance-based long-range expected value function $Q_D(S, a)$ of performing action a in state s. Typically, the objective in learning a distance metric $D(\ )$ is to optimize the accuracy of the value function $Q_D(\ )$ (e.g., expressed as minimization of a Bellman error criterion).

In some embodiments, the learned management policy may be obtained directly from the value function $Q_D(\ )$ (e.g., by choosing the action a*, from among all possible actions a in state s, that maximizes the value function $Q_D(s,a)$). In other embodiments of the invention, techniques for non-linear dimensionality reduction using the learned distance metric $D(\ )$ are applied to obtain a reduction mapping RO, which maps (state, action) pairs into a lower-dimension representation. One can then apply any one or more of a number of known reward-based learning methods to a lower-dimension data set obtained using the reduction mapping RO in order to obtain a management policy. In some embodiments of the invention, the lower-dimension data set may be obtained from the original exemplars used to train the distance metric $D(\ )$, while in other embodiments, a different data set may be used.

Embodiments of the present invention employ reward-based learning methodologies, including well-known Reinforcement Learning (RL) techniques, in order to generate effective policies (i.e., deterministic or non-deterministic behavioral rules or mappings of system states to management actions) for management of a system. Within the context of the present invention, the term "reward-based learning" refers to machine learning methods that directly or indirectly learn policies based on one or more temporally related observations of an environment's current state, an action taken in the state, and an instantaneous "reward" (e.g., a scalar measure of value) obtained as a consequence of performing the given action in the given state. Further, within the context of the present invention, "Reinforcement Learning" refers to a general set of trial-and-error reward-based learning methods whereby an agent can learn to make good decisions in an environment through a sequence of interactions. Known Reinforcement Learning methods that may be implemented in accordance with the present invention include value-function learning methods (such as Temporal Difference Learning, Q-Learning or Sarsa), actor-critic methods and direct policy methods (e.g., policy gradient methods).

Figure 1:
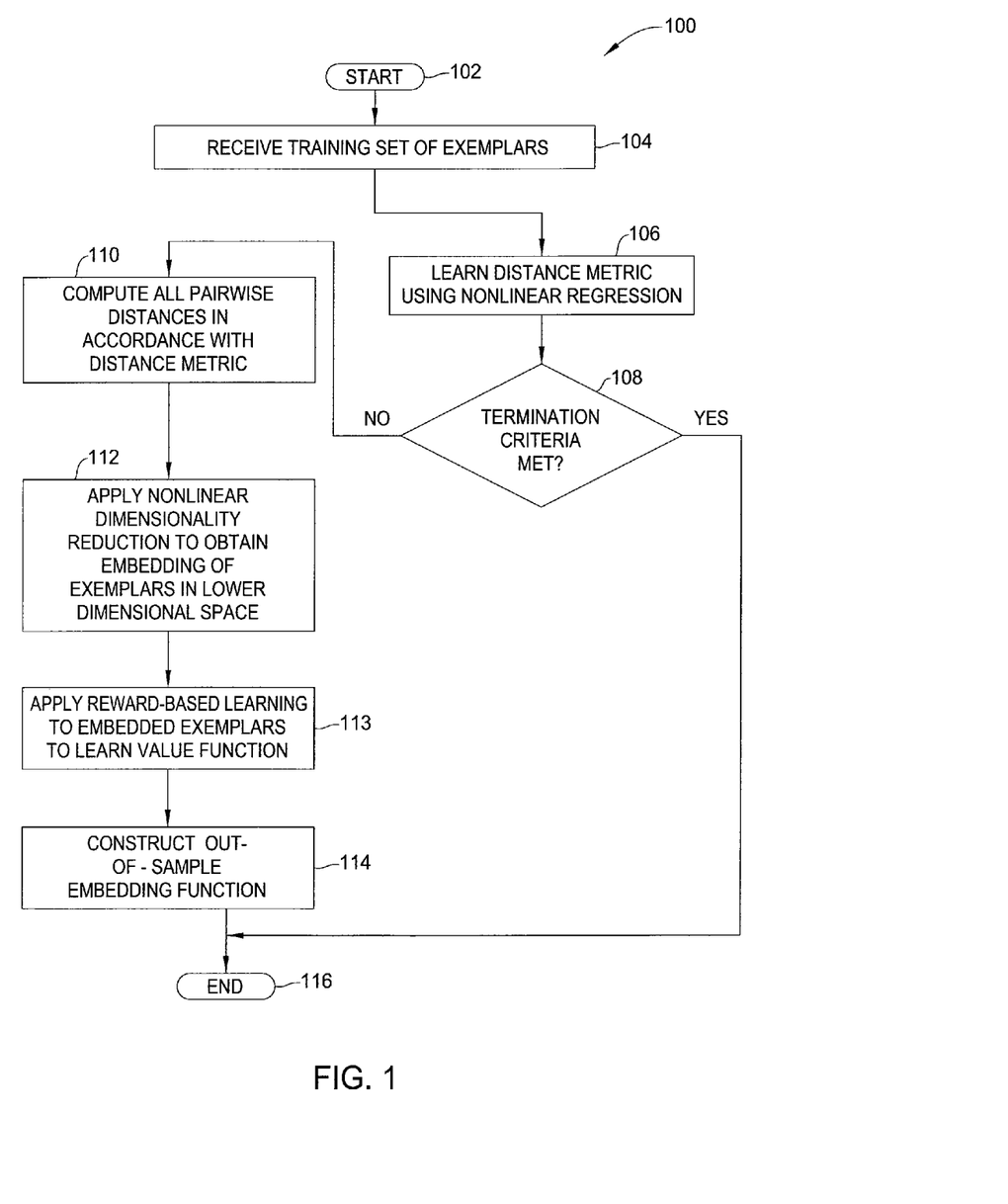
FIG. 1 is a flow diagram illustrating one embodiment of a method for reward-based learning, according to the present invention.

FIG. 1 is a flow diagram illustrating one embodiment of a method 100 for reward-based learning, according to the present invention. Specifically, given a training set comprising a plurality of (state, action, reward) tuples, the method 100 automatically generates a distance metric D( ) over pairs of (state, action) tuples in a manner that optimizes the accuracy of a distance-dependent function approximator $Q_D(s,a)$ that estimates the long-range value of performing action a in state s. The benefit of the optimized distance metric is that it allows for techniques of linear and/or nonlinear dimensionality reduction to be employed when using reward-based learning techniques, thereby ameliorating curse-of-dimensionality issues in high-dimensional state spaces and/or action spaces. The method 100 thus may be implemented, for example, to develop a policy for managing or controlling a system or plant.

The method 100 is initialized at step 102 and proceeds to step 104, where the method 100 receives a training set of S exemplars comprising a plurality of fully or partially observed (state, action, reward, new state) tuples, herein denoted as (s, a, r, s'). At least two of the exemplars comprise a (state, action) pair, and at least one exemplar additionally comprises an observed reward responsive to performing a particular action in a particular state, along with an observed transition to a new state.

In step 106, the method 100 learns a distance metric, D( ), expressing the distance between any two (state, action) pairs, while simultaneously learning a distance-dependent nonlinear function approximator $Q_D(s,a)$ (hereafter denoted simply as Q(s,a)) estimating an expected value of performing action a in state s. In one embodiment, the distance metric is learned in accordance with the methods described in U.S. patent application Ser. No. 11/550,192, filed Oct. 17, 2006, which is herein incorporated by reference in its entirety. In this case, the immediate reward, $r_i$, for the (state, action) pair, i, is the regression target value for the (state, action) pair i, and thus the learned function approximator Q(s,a) estimates an expected immediate reward of performing action a in state s. In other embodiments, Q(s,a) estimates an expected long-range cumulative discounted reward, and is trained according to the method 300 described below with respect to FIG. 3.

In step 108, the method 100 applies one or more criteria to assess whether the method may terminate by delivering the learned distance metric D( ) and function approximator Q( ) to be used for decision making in the target application. As stated previously, a management policy may be obtained from Q(s,a) by choosing the action a*, from among all possible actions a in state s, that maximizes Q(s,a). In one embodiment, the method may terminate if a Bellman error measure reaches a sufficiently small value. In other embodiments, the method may terminate if the learned policy is deemed sufficiently effective (e.g., achieves a sufficiently high reward) by simulated or live testing in the target application. If the termination criteria are achieved at step 108, then the method 100 delivers the learned policy, comprising the learned distance metric, D( ), and learned function approximator, Q( ), for use in the target application and terminates in step 116.

Alternatively, if the termination criteria are not reached in step 108, the method 100 proceeds to step 110 and uses the learned distance metric to compute all pairwise distances, $d_{ij}=D((s_i, a_i), (s_j, a_j))$, between (state, action) pairs i and j.

Once the (state, action) pairs and the pairwise distances are known, the method 100 proceeds to step 112 and applies nonlinear dimensionality reduction to the (state, action) pairs using the pairwise distances in order to obtain an embedding of the (state, action) pairs in a lower-dimensional space. In one embodiment, the applied nonlinear dimensionality reduction technique comprises one or more of the following algorithms: Laplacian Eigenmaps, Maximum Variance Unfolding, Isomap, Spatio-temporal Isomap, Local Linear Embedding, or Stochastic Proximity Embedding.

Having embedded the exemplars in a lower-dimensional space, the method 100 proceeds to step 113, where the method 100 applies a reward-based learning algorithm (e.g., a Reinforcement Learning algorithm) to the set of embedded exemplars. In one embodiment, the nonlinear dimensionality reduction and reward-based learning are performed in accordance with the methods described in U.S. patent application Ser. No. 11/870,698, filed Oct. 11, 2007, which is herein incorporated by reference in its entirety. The reward-based learning algorithm incrementally learns a value function, Q(z), where z denotes an embedding of a (state, action) pair (s, a), and Q(z) denotes the cumulative discounted or undiscounted long-range expected value when action a is taken in state s. The value function Q(z) induces a management or control policy by application of a value-maximization principle that stipulates selecting, among all admissible actions that could be taken in state s, the action with the greatest expected value. The value function Q(z) may be learned by a value function learning algorithm such as Temporal Distance Learning, Q-Learning or Sarsa. For example, in the Sarsa(0) algorithm, one applies to each observed state/action/reward tuple the following learning algorithm:

$$\Delta Q(z^t)=\alpha(t)[r^t+\gamma Q(z^{t+1})-Q(z^t)] \quad \text{(EQN. 1)}$$

where $Z^t$ is the initial embedded (state, action) pair at time t, $r^t$ is the immediate reward at time t for taking the action $a^t$ in the initial state $s^t$, $z^{t+1}$ is the next embedded (state, action) pair at time t+1, γ is a constant representing a "discount parameter" (having a value between zero and one that expresses the present value of an expected future reward) and α(t) is a "learning rate" parameter that decays to zero asymptotically to ensure convergence.

The method 100 then proceeds to step 114 and, from the lower-dimensional embedded exemplars, constructs an out-of-sample embedding function, EO, mapping general (state, action) pairs (s,a) into a lower-dimensional representation z. In one embodiment, the embedding function is constructed from the lower-dimensional embedded exemplars using Local Linear Embedding. Once the embedding function, EO, has been constructed, the method 100 then delivers the learned policy, comprising the embedding function EO and the value function over the embedding space, Q(z), and terminates in step 116. In one embodiment, the construction of the lower-dimensional embedding is performed in accordance with the methods described in U.S. patent application Ser. No. 11/870,698, filed Oct. 11, 2007, which is herein incorporated by reference in its entirety.

Embodiments of the method 100 thus take a "raw" training set of data suitable for reward-based learning methods (such as, for example, Reinforcement Learning (RL)) and automatically learns a long-range expected value function and a task-specific distance metric that optimizes the accuracy of the value function. The distance metric may provide the basis for the application of linear and/or nonlinear dimensionality reduction techniques in order to obtain a transformed, lower-dimension training set. One can then apply any one or more of a number of known RL methods to the lower-dimension training set in order to obtain a behavioral policy. An advantage of learning the distance metric (e.g., in accordance with step 110) is that the learned distance metric is a reward-relevant distance metric, so that one may expect the learned embedding function to preserve information relevant to predicting reward.

The method 100 may be implemented in many different applications. For example, the method 100 may be implemented in the field of systems management, where quantities that describe the state of a distributed computing system comprise, for example, workload levels, queue lengths, response times and throughput measures, central processing unit and memory utilizations, or the like; quantities that describe management actions comprise, for example, allocated resource levels, control parameter/configuration settings, or the like; and rewards may represent an expected value of an overall multi-criteria utility function that expresses how well the system is performing with respect to a set of system management objectives.

In other embodiments, the method 100 may be applied to develop feedback controllers for "plants" (i.e., certain physical processes or systems amenable to regulation by feedback control). Examples include applications such as thermal regulation, fluid flow/electric current control, manufacturing assembly line control, and chemical process control. In this type of application, the state variables comprise measurements of system quantities that are being regulated (e.g., temperature, vehicle speed and direction, fluid flow rates, etc.), as well as other quantities relevant to the dynamic evolution of system state over time. Control actions comprise adjustments to elements of the systems (e.g., throttles, fan speeds, valve openings, assembly line machines that can be turned on/off, etc.) that affect future evolution of the state of the system. The reward may pertain to differences between one or more state variables and one or more corresponding target or reference values of said state variables, with small differences corresponding to high reward, and large differences corresponding to low reward.

Figure 2:
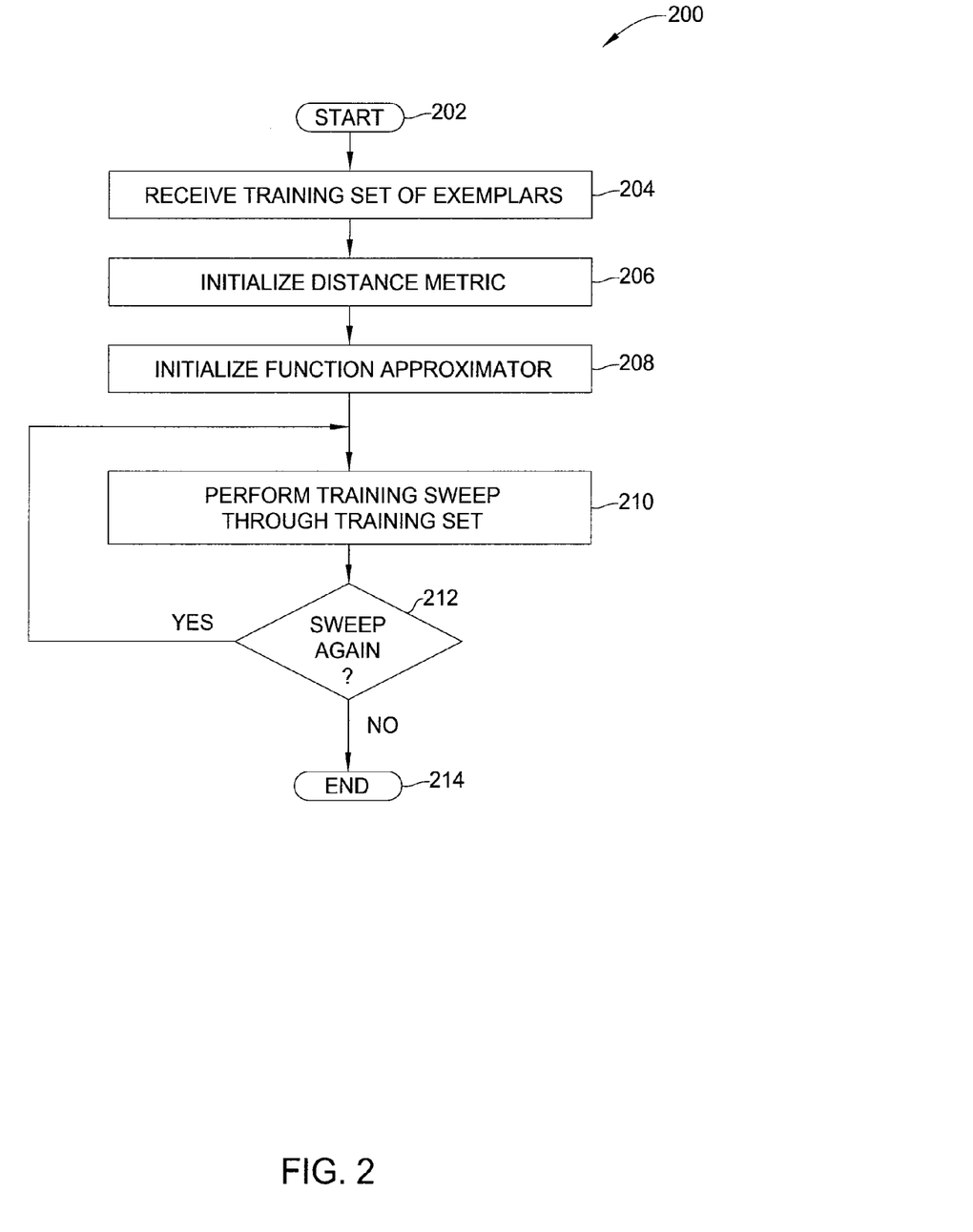
FIG. 2 is a flow diagram illustrating a second embodiment of a method for reward-based learning, according to the present invention.

FIG. 2 is a flow diagram illustrating a second embodiment of a method 200 for reward-based learning, according to the present invention. Specifically, the method 200 is a method for learning the distance metric, $D((s, a), (s', a'))$, in which the regression targets are long-range expected values, $Q_i$, rather than immediate rewards, $r_i$.

The method 200 is initialized at step 202 and proceeds to step 204, where the method 200 receives a training set of S exemplars. At least two of the exemplars i in the training set comprise an input pattern $\overrightarrow{(s,a)}_i$ (i.e., a point in an N-dimensional input space), and at least one of the exemplars comprises an immediate reward $r_i$ (e.g., a scalar value) associated with the input pattern $\overrightarrow{(s,a)}_i$.

At step 206, the method 200 initializes a distance metric $D(\overrightarrow{(s,a)},\overrightarrow{(s',a')})$. The distance metric is a global function for computing a distance between general points $\overrightarrow{(s,a)}$ and $\overrightarrow{(s',a')}$ in the input space. In one embodiment, the distance metric takes the form of a Mahalanobis distance:

$$D(\overrightarrow{(s, a)}, \overrightarrow{(s', a')}) = \sqrt{\sum_{i,j} M_{ij}((s_i, a_i) - (s'_i, a'_i))((s_j, a_j) - (s'_j, a'_j))} \quad \text{(EQN. 2)}$$

where $M_{ij}$ denotes the elements of a positive semi-definite matrix M. In this case, initialization of the distance metric comprises setting initial values of $M_{ij}$. In one embodiment, any one of a number of initialization schemes may be implemented to initialize the elements of $M_{ij}$, including setting the elements of $M_{ij}$ to random values or to values corresponding to an identity matrix. In another embodiment, initial values $L_{ij}$ of elements of a linear transformation matrix L are provided, where the matrix L relates to the matrix M according to:

$$M = L \cdot L^T \quad \text{(EQN. 3)}$$

with $L^T$ denoting the transpose of the matrix L.

In step 208, the method 200 initializes a function approximator $F(\overrightarrow{(s,a)})$. In one embodiment, the function approximator is a distance-based nonlinear function approximator. In a further embodiment, the function approximator is governed by a set of k distances $\{d_1, d_2, \ldots, d_k\}$ between $\overrightarrow{(s,a)}$ and a set of k reference points $\{\overrightarrow{(s_1,a_1)}, \overrightarrow{(s_2,a_2)}, \ldots \overrightarrow{(s_k,a_k)}\}$. In this case, initialization of the function approximator comprises setting the number and locations of the reference points, as well as setting the initial distance function $D(\overrightarrow{(s,a)},\overrightarrow{(s',a')})$ in step 204.

In a further embodiment still, the number (k) of reference points equals the number of exemplars (S) in the training set. In this case, the locations of the reference points coincide with the locations of the input exemplars. Additionally, the function approximator comprises a normalized sum of Radial Basis Functions, i.e.:

$$F(\overrightarrow{(s, a)}) = \sum_{j=1}^{S} \frac{w_j(\overrightarrow{(s, a)}) * Q_j}{\Omega(\overrightarrow{(s, a)})} \quad \text{(EQN. 4)}$$

where $Q_j$ is the target output value (long-range expected value) for exemplar ((state, action) pair) j, $$w_j(\overrightarrow{(s,a)}) = \exp(-d_j(\overrightarrow{(s,a)})) \quad \text{(EQN. 5)}$$

with $$d_j(\overrightarrow{(s,a)}) = D^2(\overrightarrow{(s,a)},\overrightarrow{(s_j,a_j)}) \quad \text{(EQN. 6)}$$

and $$\Omega(\overrightarrow{(s,a)}) = \Sigma_{j=1}^{S} w_j(\overrightarrow{(s,a)}) \quad \text{(EQN. 7)}$$

In this case, initializing the function approximator comprises setting an initial value Q for each exemplar ((state, action) pair) j. In some embodiments, the $Q_j$ values are initialized to random values, while in other embodiments, the $Q_j$ values are set equal to the immediate reward values $r_j$.

In yet another embodiment, the function approximator comprises additional adjustable structure or parameters θ. In this case, initialization of the function approximator further comprises an initialization of θ in accordance with established methods in the art. For example, if the function approximator is based on neural networks with adjustable weight values, initialization of the function approximator might comprise initializing the weight values in accordance with standard methods (e.g., randomly).

Figure 3:
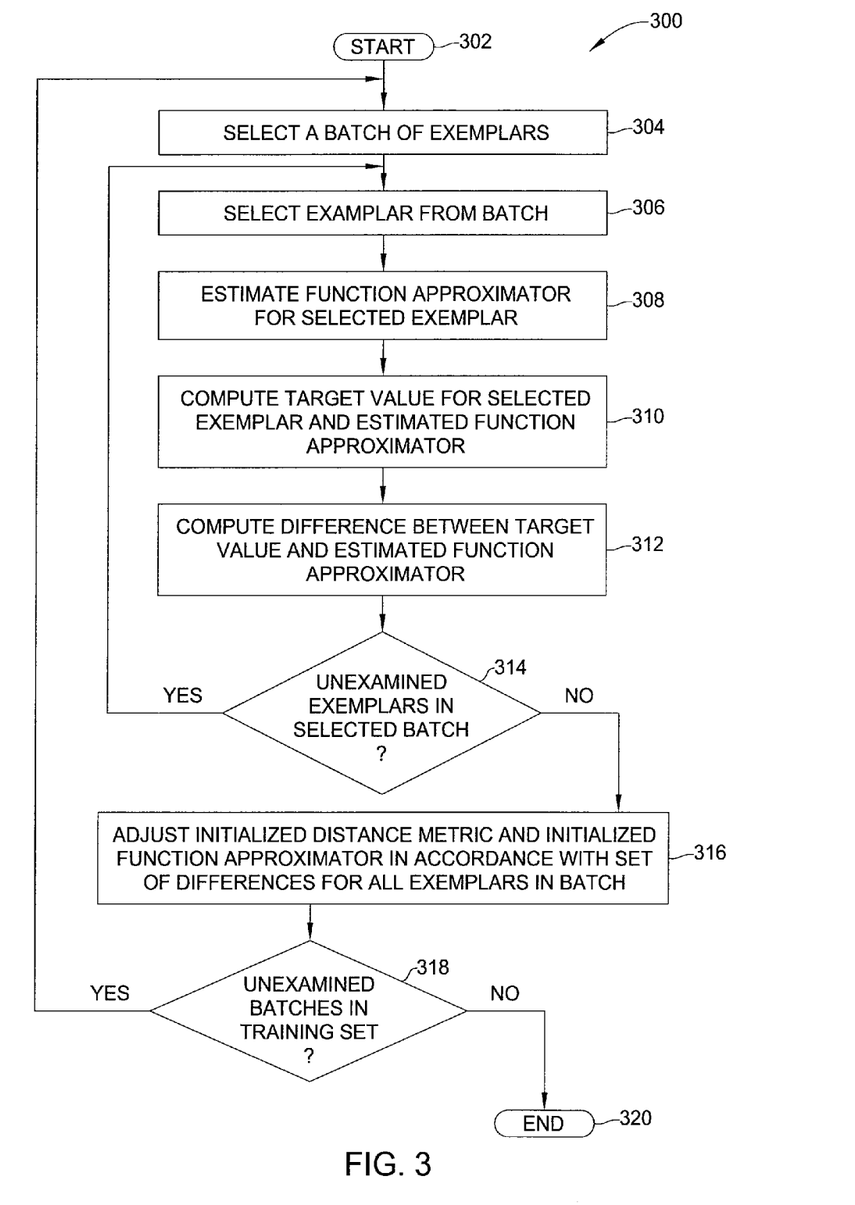
FIG. 3 is a flow diagram illustrating one embodiment of a method for training on a batch of exemplars.

In step 210, the method 200 performs a training sweep through the training set of exemplars. In one embodiment, a training sweep comprises training on batches (i.e., subsets) of the exemplars. In one embodiment, the size of a batch for training sweep purposes ranges from a single exemplar to the entire set of exemplars. In one embodiment, training on a batch of exemplars is performed in accordance with a known Reinforcement Learning (RL) algorithm (e.g., Q-learning or Sarsa). In one embodiment, the sweep through the exemplars is performed in a random order. In an alternate embodiment, the sweep through the exemplars is performed in a defined sequential order. The output of the training sweep is a trained function approximator F( ) and a trained distance metric D( ). The primary goal of the training sweep(s), as described in greater detail with respect to FIG. 3, is to progressively adjust the parameters encoding the distance function (e.g., the matrix elements encoding a Mahalanobis distance), as well as any adjustable structure or parameters θ of the function approximator (including the target values $Q_j$ for each sample j), such that a Bellman error measure of the function approximator (as described below in greater detail with respect to FIG. 3) on the set of exemplars is minimized. The training sweep may also incorporate established statistical methods (e.g., regularization methods) aimed at reducing the occurrence of overfitting, as also described in greater detail with respect to FIG. 3.

In step 212, the method 200 determines whether another training sweep should be performed through the training set of exemplars. In one embodiment, the method 200 performs another training sweep if a termination criterion (i.e., a criterion dictating when to terminate training) has not been met. In one embodiment, the termination criterion is met if the total Bellman error E over the entire training set of exemplars falls below a predefined threshold value. In another embodiment, the termination criterion is met if a rate of decrease of the total Bellman error E per training sweep reaches a predefined threshold value. In another embodiment still, the termination criterion is met if an upper bound on a total number of training sweeps is met.

In yet another embodiment, the termination criterion is based on one or more established "early stopping" methods to avoid overfitting (i.e., learning a model that performs well on the training data, but generalizes poorly to additional data not seen during the training process). For example, training may be terminated at the point at which the "cross-validation error" (i.e., average error on holdout data over a number of runs in which the data is randomly partitioned into training data and holdout data) is minimized.

If the method 200 concludes in step 212 that another training sweep should be performed, the method 200 returns to step 210 and proceeds as described above to perform another training sweep.

Alternatively, if the method 200 concludes in step 212 that another training sweep should not be performed, the method 200 terminates in step 214.

The method 200 thus takes a "raw" set of training data suitable for reward-based learning methods (such as, for example, Reinforcement Learning (RL)), and automatically learns a long-range expected value function, and a task-specific distance metric that optimizes the accuracy of the value function. The distance metric may provide the basis for the application of linear and/or nonlinear dimensionality reduction techniques in order to obtain a transformed, lower-dimension training set. One can then apply any one or more of a number of known RL methods to the lower-dimension training set in order to obtain a behavioral policy. The dimensionality reduction preserves information relevant to predicting long-term reward, which may be more useful than information relevant to predicting immediate reward (e.g., as described with reference to FIG. 1).

FIG. 3 is a flow diagram illustrating one embodiment of a method 300 for training on a batch of exemplars. The method 300 may be implemented, for example, in order to perform a training sweep on a training set of exemplars (e.g., in accordance with step 210 of the method 200).

The method 300 is initialized at step 302 and proceeds to step 304, where the method 300 selects a batch of exemplars for processing. The method 300 then proceeds to step 306 and selects an exemplar i from the selected batch. In step 308, the method 300 computes a function approximator estimate $\hat{y}_i = Q(s_i, a_i)$ for the selected exemplar i.

In step 310, the method 300 computes a target value $y_i$ for the selected exemplar i and the function approximator estimate $\hat{y}_i$, utilizing the immediate reward $r_i$ recorded in exemplar i responsive to performing action $a_i$ in state $s_i$, and a function approximator estimate $\hat{y}_{i+1} = Q(s_{i+1}, a_{i+1})$, where i+1 denotes the (i+1)-th exemplar (i.e., the temporally successive observation immediately following performance of action $a_i$ in state $s_i$). In one embodiment, the target value $y_i$ is computed according to: $y_i = r_i + \gamma \hat{y}_{i+1}$, where γ is a standard "discount parameter" known in the art, which may take values ranging from zero to one. This rule for computing the target value $y_i$ corresponds to the well-known Sarsa(0) reinforcement learning rule. In another embodiment, the target value $y_i$ is computed according to: $y_i = r_i + \gamma \max_b Q(s_{i+1}, b)$, which corresponds to the well-known Q-Learning rule.

In step 312, the method 300 computes the difference between the target value $y_i$ (computed in step 310) for the selected exemplar and the function approximator estimate $\hat{y}_i$. The method 300 then proceeds to step 314 and determines whether there are any unexamined exemplars remaining in the batch (i.e., any exemplars for whom a function approximator estimate and a difference have not been computed). If the method 300 concludes that at least one exemplar does remain to be examined in the batch, the method 300 returns to step 306 and proceeds as described above to select and process a next exemplar.

Alternatively, if the method 300 concludes in step 314 that there are no exemplars remaining to be examined in the batch, the method 300 proceeds to step 316 and adjusts the (initialized) distance metric and the (initialized) function approximator in accordance with the set of differences $\{(y_i - \hat{y}_i)\}$ for all exemplars i in the batch. These adjustments reduce a given error measure on the batch of exemplars.

In step 318, the method 300 determines whether there are any unexamined batches remaining in the training set of exemplars (i.e., any batches for whom the distance metric and function approximator have not been adjusted). If the method 300 concludes in step 318 that at least one unexamined batch remains, the method 300 returns to step 304 and proceeds as described above to select and process a next batch.

Alternatively, if the method 300 concludes in step 318 that no unexamined batches remain, the method 300 terminates in step 320.

In one embodiment, adjustments made to the distance metric and to the function approximator (e.g., in accordance with step 316 of the method 300) respect one or more hard or soft constraints on allowable adjustments. For example, in the case where the distance metric D( ) computes a Mahalanobis distance, a constraint may be imposed that dictates that the rank of the Mahalanobis matrix may not exceed a specified upper bound. Likewise, the constraints may also embody well-known statistical methods (e.g., "regularization" methods) aimed at reducing the occurrence of overfitting, as described in further detail below.

In one embodiment, if the dependence of the function approximator output y on the distance metric D( ) or on target values, $Q_j$, or on tunable parameters or structure θ is differentiable, the adjustments are computed in accordance with a standard Gradient-Descent technique (e.g., as described by D. E. Rumelhart et al. in "Parallel Distributed Processing", Vols. 1 and 2, Cambridge, Mass.: MIT Press, 1986, which is herein incorporated by reference in its entirety) applied to a quadratic Bellman error measure $\Sigma_i(y_i-\hat{y}_i)^2$ summed over all exemplars in the batch. For example, when adjusting the elements $L_{jk}$ of a linear transformation matrix L used in computing a Mahalanobis distance, the adjustment $\Delta L_{jk}$ would be computed as:

$$\Delta L_{jk} = -\varepsilon \frac{\partial}{\partial L_{jk}} \sum_i (y_i - \hat{y}_i)^2 \quad \text{(EQN. 8)}$$

where $\varepsilon$ is a small constant.

In some embodiments, the gradient computation described above may employ a so-called "direct gradient" method, (as described, for example, in the previously cited Rumelhart et al., 1986 publication) in which the target values are treated as constants, and therefore make zero contribution to the computed partial derivative. However, target values computed in step 310 are not constant, but do in fact depend on the function approximator parameter values. This implies that the direct gradient method is technically incorrect, and while it may give acceptable results in practice, it has no guarantee of convergence to a minimum error solution. To address this limitation, other embodiments of the inventive method may instead employ a "residual gradient" method (as described, for example, by Leemon C. Baird III in "Residual Algorithms: Reinforcement Learning with Function Approximation", Proceedings of ICML 1995, pp. 30-37), which guarantees convergence to a local Bellman error minimum.

In an alternative embodiment, if the dependence of the function approximator output $\hat{y}$ on the distance metric D( ) or target values, $Q_j$, or on tunable parameters or structure $\theta$ is not differentiable, the adjustments to the distance metric or to the tunable parameters or structure are computed in accordance with a standard Derivative-Free Optimization procedure (e.g., hill climbing, simulated annealing or the like).

In other embodiments, other standard error measures (e.g., cross-entropy, hinge-loss error and the like) and/or other standard optimization techniques (e.g., conjugate-gradient, quasi-Newton, second-order, convex optimization and the like) are implemented to compute adjustments to the distance metric and/or to the tunable parameters or structure. Furthermore, the training sweep methodology implemented in accordance with the present invention may incorporate any one or more of a number of well-known statistical methodologies in order to reduce the occurrence of overfitting. For example, a variety of methods for "regularization", such as penalizing learning parameters of large absolute magnitude, may be applied to the adjustments computed for the distance metric D( ) or the tunable parameters or structure $\theta$. Additionally, the criterion for termination of training may incorporate principles aimed at reducing overfitting, as described above with respect to step 112 of the method 100.

Figure 4:
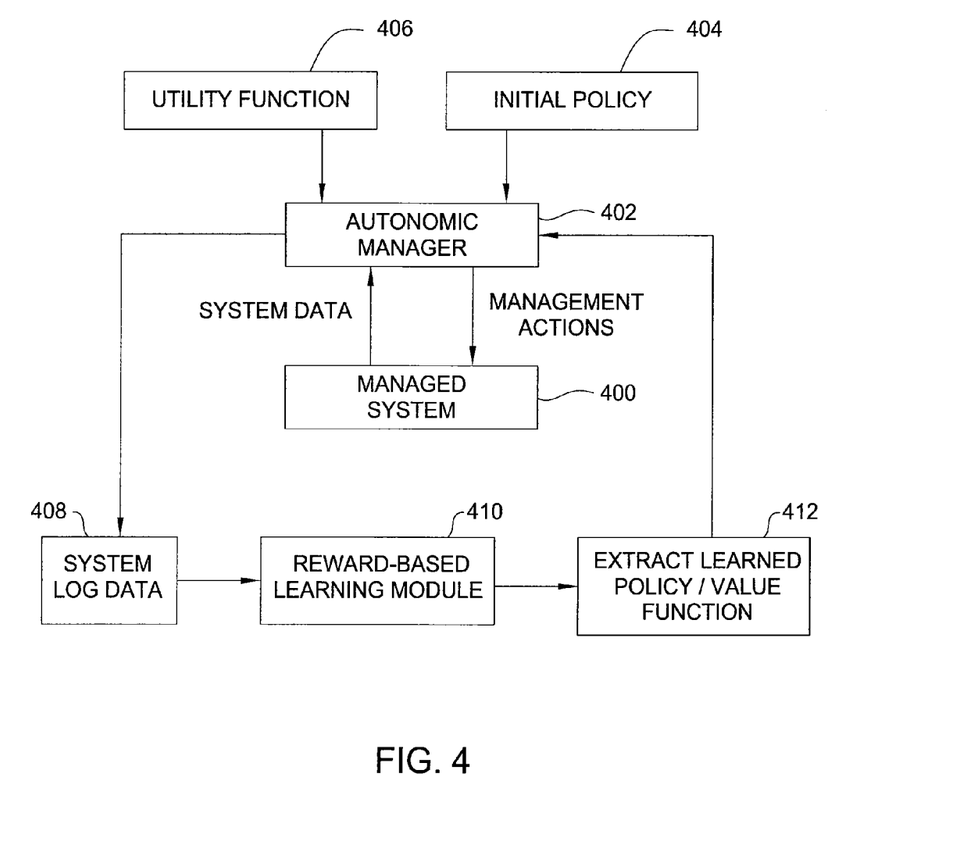
FIG. 4 is a high level block diagram illustrating one embodiment of a method for implementing and using the present invention in order to automatically derive a policy for managing a computing system.

FIG. 4 is a high level block diagram illustrating one embodiment of a method for implementing and using the present invention in order to automatically derive a policy for managing a computing system 400. Specifically, FIG. 4 depicts the relationship between an autonomic manager 402 and the managed computing system 400. The autonomic manager 402 periodically observes the state of the managed computing system 400, e.g., as indicated by various system data measurements or sensor readings. Upon observation of the system data, the autonomic manager 402 may apply one or more analysis routines to the system data (making use of, for example, policy rules, system models, or optimization routines) to compute one or more management actions, and then execute the management action(s) by manipulating one or more system effectors.

In one embodiment, the present invention is implemented by initially providing the autonomic manager 402 with an initial policy 404 and a utility function 406. The utility function 406 computes a scalar numerical measure of value (i.e., a reward signal) responsive to performing management action a in system state s. This measure of value indicates the degree of effectiveness of action a in state s relative to achieving one or more management objectives. The initial policy 404 comprises a deterministic or non-deterministic method for computing management actions as a function of system state. For the purposes of achieving effective reward-based learning, the initial policy 404 may include a facility for occasional randomized "exploration" of management actions that are expected to be sub-optimal, as indicated by, for example, low expected reward as computed by the utility function.

Having been provided with an initial policy 404 and a utility function 406, the autonomic manager 402 then interacts with the managed computing system 400 for some period of time, during which the autonomic manager 402 makes some number of observations of system state s, and, upon each observation, executes a management action a. Upon executing action a in state s, the autonomic manager 402 also uses the utility function 406 to compute a corresponding reward signal r. Upon computing the reward signal, the autonomic manager 402 then logs the (state, action, reward) tuple (s, a, r) in a system log data module 408. In one embodiment, the logging of the tuples is performed in a manner which denotes the temporal relationship between tuples, for example, by including a time stamp or an observation number, so as to facilitate reward-based learning.

Upon accumulation of sufficient number of (state, action, reward) tuples in the system log data module 408, the tuples are conveyed to a reward-based learning module 410, which applies the methods of the present invention, for example as described with respect to FIGS. 1-3, in order to obtain a learned management policy, typically expressed in the form a learned value function $Q_D( )$ combined with a learned distance metric D( ). The learned management policy is then extracted in an extraction module 412 and implemented in the autonomic manager 402, where the autonomic manager 402 replaces the initial policy 404 with the learned management policy extracted by the extraction module 412.

In some embodiments, implementation of the present invention as depicted in FIG. 4 is executed for multiple iterations, wherein the learned policy extracted at the end of each iteration provides the basis for a new round of logging of (state, action, reward) tuples in the system log data module 408. This, in turn, provides the basis for a new round of applying reward-based according to the present invention. In some embodiments, the data collected using the new learned policy replaces all prior data sets collected using previous policies, while in other embodiments the new data is merely appended to prior data, so that each additional round of reward-based learning is performed using all data collected from all prior policies.

Figure 5:
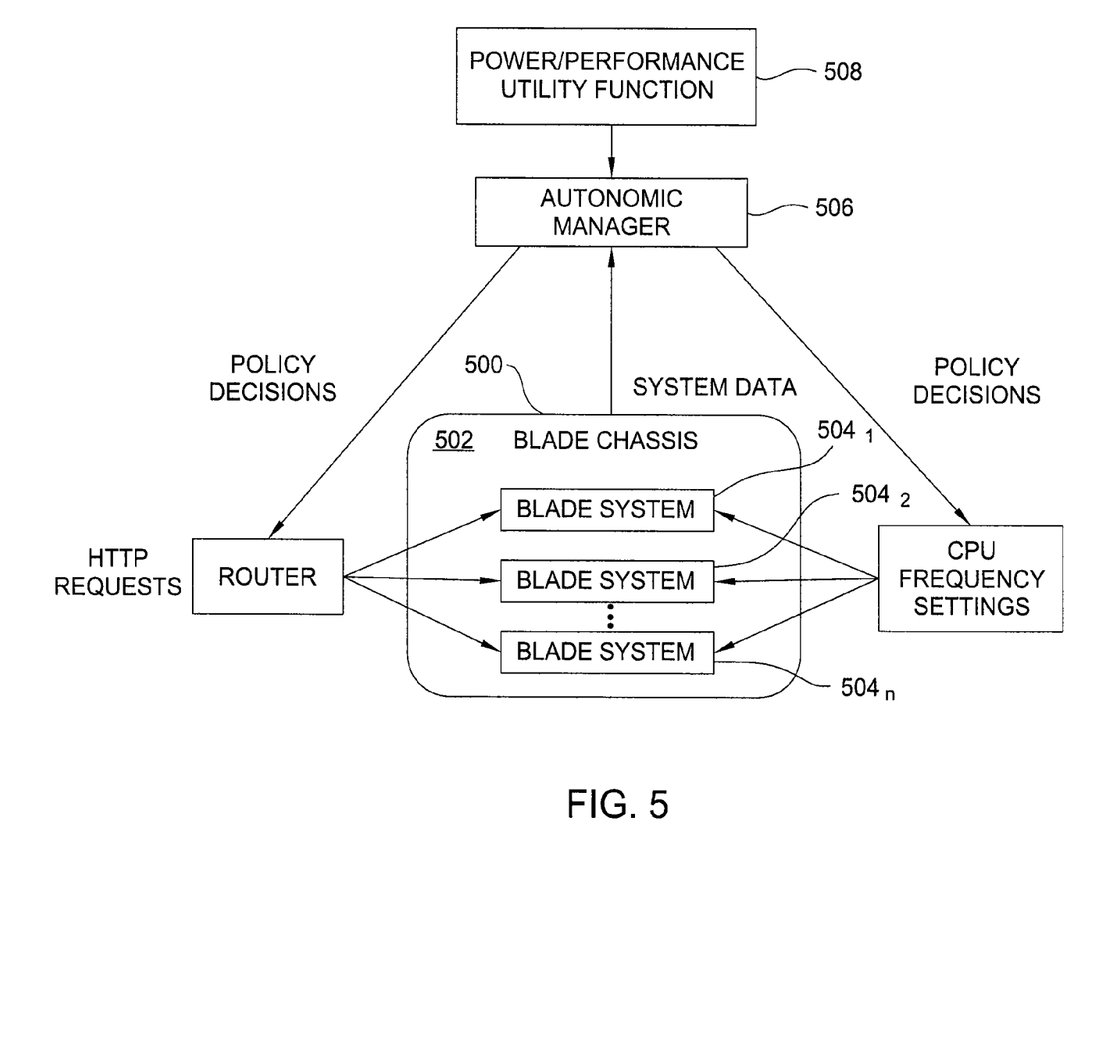
FIG. 5 is a high-level block diagram illustrating an alternative to FIG. 4, in which the managed computing system is specifically a blade cluster servicing commercial web traffic.

FIG. 5 is a high-level block diagram illustrating an alternative to FIG. 4, in which the managed computing system is specifically a blade cluster 500 servicing commercial web traffic (arriving at, e.g., an online search engine or an online shopping web site). The blade cluster 500 comprises, for example, a plurality of blade system server nodes $504_1$-$504_n$ (hereinafter collectively referred to as "server nodes 504") residing in a single blade chassis 502. In one embodiment, the server nodes 504 are configured in a single-tier or a multi-tier fashion as hypertext transport protocol (HTTP) server nodes, application server nodes, or database server nodes.

The autonomic manager module 506 operates by continually observing the state of the blade cluster 500 (e.g., once every 30 seconds) and executing management decisions that affect both the application performance (i.e., mean response time of HTTP requests) and the power consumed by each of the individual server nodes 504. In one embodiment, these management decisions comprise at least one of: routing of incoming customer HTTP requests among multiple front-end HTTP server nodes 504; routing from the front-end server nodes 504 to multiple application server nodes 504; routing from the application server nodes 504 to multiple database server nodes 504; and dynamically adjusting the central processing unit (CPU) frequency of each server node 504 via Dynamic Voltage and Frequency Scaling (DVFS) technology. The routing decisions may be effected, for example, through JAVA® method calls that set routing weights within JAVA®-based middleware platforms (e.g., Enterprise Workload Manager (EWLM) or WebSphere Extended Deployment (XD), both commercially available from International Business Machines Corp. of Armonk, N.Y., and both of which contain various performance management functionalities such as routing/load-balancing functionality). The CPU frequency decisions may be implemented, for example, by relaying intelligent platform management interface (IPMI) commands from the autonomic manager module 506 to firmware residing on the individual server nodes 504 which implements the desired level of voltage scaling and/or frequency throttling.

The routing and CPU frequency decisions made by the autonomic manager module 506 aim to achieve an optimal trade-off of application performance and system power consumption, which may be expressed as optimizing a multi-criteria utility function 508. In some embodiments, the multi-criteria utility function 508 comprises a performance-based utility function minus a power-based cost function. In one embodiment, the performance-based utility function comprises a monotone decreasing function of mean response time over a 30-second interval, derived from a Service Level Agreement (SLA) between the owner of a web site and a hosting facility, expressing various levels of payments or penalties as a function of mean application response time. In one embodiment, the power-based cost function comprises a linear function of total power consumed over a 30-second interval, related to the total cost of operating the blade cluster 500 at a given power consumption level, including associated air-conditioning and maintenance costs.

In some embodiments, the autonomic manager 506 is provided with an initial management policy that selects management actions by optimizing a queuing-theoretic system performance model. In such embodiments, it may be advantageous to modify the initial management policy to occasionally allow randomized deviations from the model-based optimal actions. In other embodiments, the initial management policy comprises a performance-biased random walk policy, in which the probabilities of increasing or decreasing CPU frequencies depends on the ratio of current mean response divided by an SLA-based target mean response time.

Given an initial management policy and the utility function 508 the autonomic manager module 506 observes the system state and executes management decisions on a periodic basis (e.g., once every 30 seconds) for a sufficient period of time (e.g., 48 hours) to accumulate a sufficient number (e.g., 5760) of recorded (state, action, reward) tuples in the system log data to enable effective reward-based learning of a new management policy. In each tuple, the recorded state information comprises sensor readings from each individual server node 504 (pertaining to, for example, arrival rate of HTTP requests, mean response time, mean throughput, mean queue length, mean power consumption, etc.). The recorded action comprises settings of routing weights and CPU frequency levels for each server node 504. The recorded reward comprises total performance-based utility and total power-based cost as computed by the utility function 508, and may additionally comprise a breakdown of performance-based utility and power-based cost per individual server node 504.

In some embodiments, the autonomic manager module 506 generates a set of training data for the present invention by making management decisions as described above in the live system using real customer workload. In other embodiments, the training data is generated by replaying recorded traces of customer workload while the system is offline (i.e., not processing live customer workload), during a period such as an evening or weekend when the web site is not open for business; this is advantageous because any poor management decisions made while collecting training data do not harm the performance as experienced by the web site's customers.

In some embodiments, given the training set of (state, action, reward) tuples as described above, the present invention proceeds as described with respect to FIGS. 1-3 to learn a linear transformation matrix L related to a Mahalanobis distance metric D( ) (as per EQN. 2), along with a radial-basis function approximator Q( ) (as per EQNs. 3-6), using the Sarsa(0) learning algorithm combined with gradient-descent minimization of Bellman error (as specified in EQN. 7). In further embodiments, the gradient-descent error minimization is terminated using an early-stopping criterion based on cross-validation, as also described above. Upon termination of learning, the learned distance metric D( ) and function approximator Q( ) then provide the basis for a new management policy, which replaces the initial policy within the autonomic manager 506.

Figure 6:
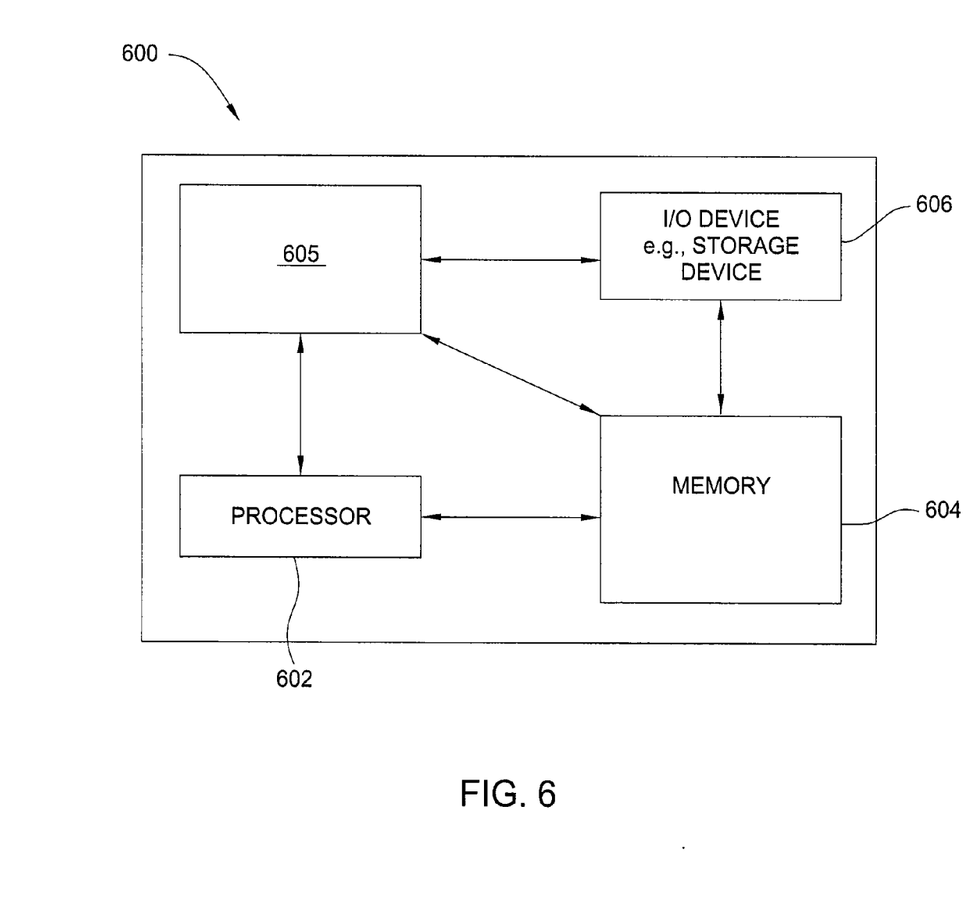
FIG. 6 is a high level block diagram of the reward-based learning method that is implemented using a general purpose computing device.

FIG. 6 is a high level block diagram of the reward-based learning method that is implemented using a general purpose computing device 600. In one embodiment, a general purpose computing device 600 includes a processor 602, a memory 604, a reward-based learning module 605 and various input/output (I/O) devices 606 such as a display, a keyboard, a mouse, a modem, and the like. In one embodiment, at least one I/O device is a storage device (e.g., a disk drive, an optical disk drive, a floppy disk drive). It should be understood that the reward-based learning module 605 can be implemented as a physical device or subsystem that is coupled to a processor through a communication channel.

Alternatively, the reward-based learning module 605 can be represented by one or more software applications (or even a combination of software and hardware, e.g., using Application Specific Integrated Circuits (ASIC)), where the software is loaded from a storage medium (e.g., I/O devices 606) and operated by the processor 602 in the memory 604 of the general purpose computing device 600. Thus, in one embodiment, the reward-based learning module 605 for reward-based learning described herein with reference to the preceding Figures can be stored on a computer readable medium or carrier (e.g., RAM, magnetic or optical drive or diskette, and the like).

Thus, the present invention represents a significant advancement in the field of autonomic computing. Embodiments of the invention learn a distance metric D( ) expressing a distance between two (state, action) pairs, while simultaneously learning a distance-based long-range expected value function $Q_D(s, a)$ of performing action a in state s. The distance metric and long-range expected value function may then be used to derive improved management or control policies for systems or plants.

While foregoing is directed to the preferred embodiment of the present invention, other and further embodiments of the invention may be devised without departing from the basic scope thereof, and the scope thereof is determined by the claims that follow.

The invention claimed is:

1. A method for learning a policy for managing a system, comprising:
    receiving a set of exemplars, where each exemplar in the set of exemplars comprises a (state, action) pair for the system and an immediate reward value responsive to the (state, action) pair, wherein the state of the (state, action) pair comprises a measurement of a regulated quantity of the system, the action of the (state, action) pair comprises an adjustment to an element of the system that affects a future evolution of a state of the system, and the immediate reward value comprises a difference between the state of the (state, action) pair and a target value of the state of the (state, action) pair such that a value of the immediate reward value is inversely proportional to a size of the difference;
    initializing a distance metric as $D(\overrightarrow{(s,a)}, \overrightarrow{(s',a')})$, where the distance metric is a global function that computes a distance between general pairs of exemplars $\overrightarrow{(s,a)}$ and $\overrightarrow{(s',a')}$ in the set of exemplars;
    initializing a function approximator that estimates a value of performing a given action in a given state, wherein the function approximator is denoted by $F(\overrightarrow{(s,a)})$ and is computed as $$F(\overrightarrow{(s,a)}) = \sum_{j=1}^{S} \frac{w_j(\overrightarrow{(s,a)}) * Q_j}{\Omega(\overrightarrow{(s,a)})},$$

wherein S denotes a number of exemplars in the set of exemplars, j denotes a $j^{th}$ exemplar in the set of exemplars, Qj denotes a target long-range expected value for the $j^{th}$ exemplar, $\Omega(\overrightarrow{(s,a)})$ is computed as $\Sigma_{j=1}^{S} w_j(\overrightarrow{(s,a)})$, $w_j(\overrightarrow{(s,a)})$ is computed as $\exp(-d_j(\overrightarrow{(s,a)}))$, and $d_j(\overrightarrow{(s,a)})$ is computed as $D^2(\overrightarrow{(s,a)}, \overrightarrow{(s_j,a_j)})$;
    performing one or more training sweeps through one or more batches, each batch comprising at least a portion of the set of exemplars;
    terminating the one or more training sweeps when a termination criterion is reached, wherein a trained distance metric and a trained function approximator are obtained simultaneously upon the terminating, the trained distance metric being a last-adjusted state of the distance metric and the trained function approximator being a last-adjusted state of the function approximator; and
    deriving the policy from the trained distance metric and the trained function approximator,
    wherein at least one of: the receiving, the initializing the distance metric, the initializing the function approximator, the performing, or the deriving is performed using a processor.

2. The method of claim 1, wherein initializing the distance metric comprises:
    setting initial values for one or more matrix elements encoding the distance metric, wherein the matrix elements are elements in a positive semi-definite matrix.

3. The method of claim 2, wherein the setting comprises: setting the initial values to random values.

4. The method of claim 2, wherein the setting comprises:
    setting the initial values to values that correspond to an identity matrix.

5. The method of claim 1, wherein the function approximator is governed by a set of distances between a (state, action) pair and a set of one or more reference points.

6. The method of claim 5, wherein initializing the function approximator comprises:
    setting a number of the one or more reference points; and
    setting locations for the one or more reference points.

7. The method of claim 5, wherein initializing the function approximator comprises:
    setting one or more adjustable parameters to initial values.

8. The method of claim 1, wherein the one or more training sweeps are performed in accordance with a Reinforcement Learning algorithm.

9. The method of claim 8, wherein the Reinforcement Learning algorithm is one of: Q-Learning and Sarsa.

10. The method of claim 1, further comprising:
    applying nonlinear dimensionality reduction to the set of exemplars and to the distance metric in order to embed the set of exemplars in a lower-dimensional space, thereby producing embedded exemplars;
    applying reward-based learning to the embedded exemplars in order to obtain a value function over an embedding space;
    constructing an out-of-sample embedding function based on the embedded exemplars; and
    deriving the policy from the out-of-sample embedding function and the value function over the embedding space.

11. The method of claim 1, further comprising:
    applying the policy to manage a computing system or to control a plant.

12. The method of claim 1, wherein the trained function approximator is distance-dependent.

13. The method of claim 1, wherein the trained distance metric is trained to optimize an accuracy of the trained function approximator.

14. The method of claim 1, wherein the termination criterion is a predefined reward achieved by the policy.

15. The method of claim 1, wherein the termination criterion is a predefined non-zero rate of decrease of a total Bellman error measure of the function approximator over an entirety of the set of exemplars per each of the one or more training sweeps.

16. The method of claim 1, wherein the system is responsible for at least one of: thermal regulation, fluid flow, electric current control, manufacturing assembly line control, or chemical process control.

17. The method of claim 1, wherein a training sweep of the one or more training sweeps comprises:
    computing, for at least one exemplar in the at least a portion of the set of the one or more exemplars, a difference between a target value of the at least one exemplar and a function approximator estimate of the at least one exemplar; and
    adjusting the function approximator in response to the difference.

18. The method of claim 17, wherein the distance metric takes the form of a Mahalanobis distance, and wherein the training sweep further comprises:

adjusting one or more matrix elements encoding the Mahalanobis distance in response to the difference.

19. A computer readable medium containing an executable program for learning a policy for managing a system, where the program performs steps of:

receiving a set of exemplars, where each exemplar in the set of exemplars comprises a (state, action) pair for the system and an immediate reward value responsive to the (state, action) pair, wherein the state of the (state, action) pair comprises a measurement of a regulated quantity of the system, the action of the (state, action) pair comprises an adjustment to an element of the system that affects a future evolution of a state of the system, and the immediate reward value comprises a difference between the state of the (state, action) pair and a target value of the state of the (state, action) pair such that a value of the immediate reward value is inversely proportional to a size of the difference;

initializing a distance metric as $D(\overrightarrow{(s,a)}, \overrightarrow{(s',a')})$, where the distance metric is a global function that computes a distance between general pairs of exemplars $\overrightarrow{(s,a)}$ and $\overrightarrow{(s',a')}$ in the set of exemplars;

initializing a function approximator that estimates a value of performing a given action in a given state, wherein the function approximator is denoted by $F(\overrightarrow{(s,a)})$ and is computed as $$F(\overrightarrow{(s,a)}) = \sum_{j=1}^{S} \frac{w_j(\overrightarrow{(s,a)}) * Q_j}{\Omega(\overrightarrow{(s,a)})},$$

wherein S denotes a number of exemplars in the set of exemplars, j denotes a $j^{th}$ exemplar in the set of exemplars, Qj denotes a target long-range expected value for the $j^{th}$ exemplar, $\Omega(\overrightarrow{(s,a)})$ is computed as $\Sigma_{j=1}^{S} w_j(\overrightarrow{(s,a)})$, $w_j(\overrightarrow{(s,a)})$ is computed as $\exp(-d_j(\overrightarrow{(s,a)}))$, and $d_j(\overrightarrow{(s,a)})$ is computed as $D^2(\overrightarrow{(s,a)},\overrightarrow{(s_j,a_j)})$;

performing one or more training sweeps through one or more batches, each batch comprising at least a portion of the set of exemplars;

terminating the one or more training sweeps when a termination criterion is reached, wherein a trained distance metric and a trained function approximator are obtained simultaneously upon the terminating, the trained distance metric being a last-adjusted state of the distance metric and the trained function approximator being a last-adjusted state of the function approximator; and deriving the policy from the trained distance metric and the trained function approximator, wherein at least one of: the receiving, the initializing the distance metric, the initializing the function approximator, the performing, or the deriving is performed using a processor.

20. The computer readable medium of claim 19, wherein the function approximator is governed by a set of distances between a (state, action) pair and a set of one or more reference points.

21. The computer readable medium of claim 20, wherein initializing the function approximator comprises:

setting a number of the one or more reference points; and
setting locations for the one or more reference points.

22. The computer readable medium of claim 20, wherein initializing the function approximator comprises:

setting one or more adjustable parameters to initial values.

23. The computer readable medium of claim 19, wherein the one or more training sweeps are performed in accordance with a Reinforcement Learning algorithm.

24. A system for learning a policy for managing a system, comprising:

a processor configured to:

receive a set of exemplars, where each exemplar in the set of exemplars comprises a (state, action) pair for the system and an immediate reward value responsive to the (state, action) pair, wherein the state of the (state, action) pair comprises a measurement of a regulated quantity of the system, the action of the (state, action) pair comprises an adjustment to an element of the system that affects a future evolution of a state of the system, and the immediate reward value comprises a difference between the state of the (state, action) pair and a target value of the state of the (state, action) pair such that a value of the immediate reward value is inversely proportional to a size of the difference;

initialize a distance metric as $D(\overrightarrow{(s,a)}, \overrightarrow{(s',a')})$, where the distance metric is a global function that computes a distance between general pairs of exemplars $\overrightarrow{(s,a)}$ and $\overrightarrow{(s',a')}$ in the set of exemplars;

initialize a function approximator that estimates a value of performing a given action in a given state, wherein the function approximator is denoted by $F(\overrightarrow{(s,a)})$ and is computed as $$F(\overrightarrow{(s,a)}) = \sum_{j=1}^{S} \frac{w_j(\overrightarrow{(s,a)}) * Q_j}{\Omega(\overrightarrow{(s,a)})},$$

wherein S denotes a number of exemplars in the set of exemplars, j denotes a $j^{th}$ exemplar in the set of exemplars, Qj denotes a target long-range expected value for the $j^{th}$ exemplar, $\Omega(\overrightarrow{(s,a)})$ is computed as $\Sigma_{j=1}^{S} w_j(\overrightarrow{(sa)})$, $w_j(\overrightarrow{(s,a)})$ is computed as $\exp(-d_j(\overrightarrow{(s,a)}))$, and $d_j(\overrightarrow{(s,a)})$ is computed as $D^2(\overrightarrow{(s,a)},\overrightarrow{(s_j,a_j)})$;

perform one or more training sweeps through one or more batches, each batch comprising at least a portion of the set of one or more exemplars;

terminate the one or more training sweeps when a termination criterion is reached, wherein a trained distance metric and a trained function approximator are obtained simultaneously upon the terminating; and derive the policy from the trained distance metric and the trained function approximator.

* * * * *